United States Patent
Cremer et al.

(10) Patent No.: US 12,215,213 B2
(45) Date of Patent: Feb. 4, 2025

(54) THERMOPLASTIC MOULDING COMPOUND

(71) Applicant: BASF SE, Ludwigshafen am Rhein (DE)

(72) Inventors: Jens Cremer, Ludwigshafen (DE); Patrick Spies, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 707 days.

(21) Appl. No.: 17/432,540

(22) PCT Filed: Feb. 18, 2020

(86) PCT No.: PCT/EP2020/054141
§ 371 (c)(1),
(2) Date: Aug. 20, 2021

(87) PCT Pub. No.: WO2020/169547
PCT Pub. Date: Aug. 27, 2020

(65) Prior Publication Data
US 2022/0185994 A1    Jun. 16, 2022

(30) Foreign Application Priority Data
Feb. 20, 2019   (EP) .................................... 19158330

(51) Int. Cl.
*C08K 7/14* (2006.01)
*C03C 3/087* (2006.01)
*C03C 13/00* (2006.01)
*C08L 77/02* (2006.01)
*C08L 77/06* (2006.01)

(52) U.S. Cl.
CPC ................ *C08K 7/14* (2013.01); *C03C 3/087* (2013.01); *C03C 13/00* (2013.01); *C08L 77/02* (2013.01); *C08L 77/06* (2013.01); *C03C 2213/00* (2013.01)

(58) Field of Classification Search
None
See application file for complete search history.

(56) References Cited

U.S. PATENT DOCUMENTS

| | | |
|---|---|---|
| 2009/0286440 A1 | 11/2009 | Lecomte et al. |
| 2014/0066560 A1 | 3/2014 | Stoppelmann et al. |
| 2016/0068428 A1 | 3/2016 | Li et al. |
| 2018/0179380 A1 | 6/2018 | Kunishima |

FOREIGN PATENT DOCUMENTS

EP    2719727 A1    4/2014

OTHER PUBLICATIONS

International Search Report for corresponding PCT/EP2020/054141 mailed May 6, 2020, 2 Pages.
Preliminary Report on Patentability, for corresponding PCT/EP2020/054141, 29 Pages.

*Primary Examiner* — Nicole M. Buie-Hatcher
(74) *Attorney, Agent, or Firm* — Armstrong Teasdale LLP

(57) ABSTRACT

Described herein is a method of using glass fibers having a tensile strength according to DIN ISO 527-5 of 86.0 to 92.0 GPa, a tensile elastic modulus according to DIN ISO 527-5 of 2600 to 3200 MPa and a softening point according to DIN ISO 7884-1 of 900° C. to 950° C., the method including using the glass fibers to increase an impact strength and/or breaking elongation of molded articles made of molding materials including thermoplastic polyamides and elastomers.

18 Claims, No Drawings

THERMOPLASTIC MOULDING COMPOUND

CROSS-REFERENCE TO RELATED APPLICATIONS

This application is a U.S. National Phase Application of International Patent Application No. PCT/EP2020/054141, filed Feb. 18, 2020, which claims priority to European Patent Application No. 19158330.1, filed Feb. 20, 2019, the entire contents of which are hereby incorporated by reference herein.

The invention relates to the use of special glass fibers for increasing the impact strength and/or breaking elongation of molded articles made of thermoplastic molding materials comprising thermoplastic polyamides and to corresponding thermoplastic molding materials, to processes for the production thereof, to the use thereof and to fibers, films or molded articles made of the thermoplastic molding material.

It is known to increase the impact strength and/or breaking elongation of polyamides by mixing the polyamides with functionalized elastomers. The tensile modulus and the breaking stress may be reduced at the same time.

U.S. Pat. No. 5,482,997 relates to polyamide compositions comprising an elastomer having polyamide-reactive groups to increase impact resistance. Employed for example is an ethylene-propylene-ethylidene-norbornene terpolymer grafted with maleic anhydride or a thermoplastic polymer, based on equal amounts of polypropylene and EPDM rubber, grafted with maleic anhydride.

U.S. Pat. No. 5,602,200 describes polyamide/polyolefin blends comprising an unmodified polypropylene or unmodified polyethylene and optionally also an ethylene-propylene-diene elastomer grafted with carboxylic acid or maleic anhydride.

Blends of polyamide (PA) and polyolefin elastomers (POE) exhibit improved properties in terms of hardness and stress/strain behavior. Since the compatibility of polyamide and polyolefin elastomers is limited, functionalized polyolefin elastomers are often employed, for example polyolefin elastomers grafted with maleic anhydride. At larger proportions of polyolefin elastomers in the blends, the compatibility cannot be further improved by grafting with maleic anhydride since the number of reactive end groups in the polyamide is limited.

In addition, the use of special glass fibers in polyamides is advantageous for achieving a high stiffness, tear strength and impact strength.

EP 2 703 436 A1 describes polyamide molding materials which comprise not only particulate fillers but also high-strength glass fibers substantially composed of silicon dioxide, aluminum oxide and magnesium oxide. Preferred glass fibers comprise at least 5% by weight of magnesium oxide and not more than 10% by weight of calcium oxide.

EP 3 130 663 A1 relates to reinforced, in particular long glass fiber-reinforced, polyamides which exhibit good mechanics and better shrinkage during processing. The polyamides comprise special glass fibers composed of 57.5% to 59.5% by weight of $SiO_2$, 17% to 20% by weight of $Al_2O_3$, 11% to 13.5% by weight of CaO and 8.5% to 12.5% by weight of MgO.

It is an object of the invention to provide thermoplastic molding materials comprising thermoplastic polyamides which coupled with high stiffness and strength exhibit an elevated impact strength and breaking elongation.

It is a further object of the invention to provide an additive which makes it possible to increase the impact resistance and/or breaking elongation of molded articles made of thermoplastic molding materials comprising thermoplastic polyamides, wherein the molding materials further comprise at least one elastomer.

The object is achieved according to the invention through the use of glass fibers having a tensile strength according to DIN ISO 527-5 of 86.0 to 92.0 GPa, a tensile elastic modulus according to DIN ISO 527-5 of 2600 to 3200 MPa and a softening point according to DIN ISO 7884-1 of 900° C. to 950° C., preferably through the use of glass fibers having the composition C1) 55.5% to 62.0% by weight of $SiO_2$,
C2) 14.0% to 18.0% by weight of $Al_2O_3$,
C3) 11.0% to 16.0% by weight of CaO,
C4) 6.0% to 10.0% by weight of MgO,
C5) 0% to 4.0% by weight of further oxides, wherein the proportions of C3) CaO and C4) MgO sum to between 17.0% by weight and 24.0% by weight and the percentages by weight of C1) to C5) sum to 100% by weight, to increase the impact strength and/or breaking elongation of molded articles made of molding materials comprising thermoplastic polyamides and elastomers.

The standards refer to the standard in force in 2019.

The thermoplastic molding materials preferably in this case comprise at least one elastomer selected from b1) copolymers of ethylene with at least one comonomer selected from $C_{3-12}$-olefins, $C_{1-12}$-alkyl (meth)acrylates, (meth)acrylic acid and maleic anhydride as component B1),
b2) polyethylene or polypropylene as component B2), wherein components B1) and B2) may also be additionally grafted with maleic anhydride.

Said object is also achieved by a thermoplastic molding material comprising a) 30.0% to 89.0% by weight of at least one thermoplastic polyamide as component A),
b) 1.0% to 30.0% by weight of at least one elastomer as component B), selected from
  b1) copolymers of ethylene with at least one comonomer selected from $C_{3-12}$-olefins, $C_{1-12}$-alkyl (meth)acrylates, (meth)acrylic acid and maleic anhydride as component B1),
  b2) polyethylene or polypropylene as component B2),
  wherein components B1) and B2) may also be additionally grafted with maleic anhydride,
c) 10.0% to 69.0% by weight of glass fibers having a tensile strength according to DIN ISO 527-5 of 86.0 to 92.0 GPa, a tensile elastic modulus according to DIN ISO 527-5 of 2600 to 3200 MPa and a softening point according to DIN ISO 7884-1 of 900° C. to 950° C. as component C),
d) 0% to 30.0% by weight of further additives and processing aids as component D), wherein the percentages by weight of the components A) to D) sum to 100% by weight, preferably by a thermoplastic molding material comprising a) 30.0% to 89.0% by weight of at least one thermoplastic polyamide as component A),
b) 1.0% to 30.0% by weight of at least one elastomer as component B), selected from
  b1) copolymers of ethylene with at least one comonomer selected from $C_{3-12}$-olefins, $C_{1-12}$-alkyl (meth)acrylates, (meth)acrylic acid and maleic anhydride as component B1),
  b2) polyethylene or polypropylene as component B2),
  wherein components B1) and B2) may also be additionally grafted with maleic anhydride, c) 10.0% to 69.0% by weight of at least one glass fiber having the composition
C1) 55.5% to 62.0% by weight of $SiO_2$,
C2) 14.0% to 18.0% by weight of $Al_2O_3$,
C3) 11.0% to 16.0% by weight of CaO,
C4) 6.0% to 10.0% by weight of MgO,
C5) 0% to 4.0% by weight of further oxides,
wherein the proportions of C3) CaO and C4) MgO sum to between 17.0% and 24.0% by weight and the percentages by weight of C1) to C5) sum to 100% by weight, as component C),
d) 0% to 30.0% by weight of further additives and processing aids as component D),
wherein the percentages by weight of the components A) to D) sum to 100% by weight.

The object is further achieved by a process for producing such a thermoplastic molding material by mixing the components A) to C) and optionally D).

The object is further achieved by use of the thermoplastic molding materials through production of fibers, films and molded articles, by the corresponding fibers, films or molded articles and by processes for the production thereof. Molded articles are preferred.

It has been found according to the invention that the use of special glass fibers of the abovementioned composition result in an increase in the impact strength and/or breaking elongation of polyamide molding materials, in particular of polyamide/elastomer blends.

This effect is especially observed in molded articles composed of thermoplastic molding materials comprising not only polyamide but also at least one elastomer selected from
b1) copolymers of ethylene with at least one comonomer selected from $C_{3-12}$-olefins, $C_{1-12}$-alkyl (meth)acrylates, (meth)acrylic acid and maleic anhydride as component B1),
b2) polyethylene or polypropylene as component B2),
wherein components B1) and B2) may also be additionally grafted with maleic anhydride.

The components of the thermoplastic molding materials according to the invention are more particularly elucidated hereinbelow.

Component A)

As component A) the thermoplastic molding materials comprise 30.0% to 89.0% by weight, by preference 43.0% to 78.0% by weight, preferably 52.0% to 72.0% by weight, in particular 56.5% to 66.5% by weight, of at least one thermoplastic polyamide.

The polyamides of the molding materials according to the invention generally have a viscosity number of 90 to 210 ml/g, preferably 110 to 160 ml/g, determined in a 0.5% by weight solution in 96.0% by weight sulfuric acid at 25° C. according to ISO 307.

Semicrystalline or amorphous resins having a molecular weight (weight average) of at least 5000, such as are described for example in U.S. Pat. Nos. 2,071,250, 2,071,251, 2,130,523, 2,130,948, 2,241,322, 2,312,966, 2,512,606 and 3,393,210, are preferred.

Examples thereof are polyamides which derive from lactams having 7 to 13 ring members, such as polycaprolactam, polycaprylolactam and polylaurolactam, and also polyamides obtained by reaction of dicarboxylic acids with diamines.

Employable dicarboxylic acids include alkanedicarboxylic acids having 6 to 12 carbon atoms, in particular 6 to 10 carbon atoms, and aromatic dicarboxylic acids. These only include the acids adipic acid, azelaic acid, sebacic acid, dodecanedioic acid and terephthalic and/or isophthalic acid.

Particularly suitable diamines include alkanediamines having 6 to 12, in particular 6 to 9, carbon atoms and m-xylylenediamine, di(4-aminophenyl)methane, di(4-aminocyclohexyl)methane, 2,2-di(4-aminophenyl)propane, 2,2-di(4-aminocyclohexyl)propane or 1,5-diamino-2-methylpentane.

Preferred polyamides are polyhexamethylene adipamide, polyhexamethylene sebacamide, polycaprolactam and copolyamide 6/66, in particular having a proportion of 5% to 95.0% by weight of caprolactam units.

Suitable polyamides further include those obtainable from ω-aminoalkylnitriles such as for example aminocapronitrile (PA 6) and adipodinitrile with hexamethylenediamine (PA 66) by so-called direct polymerization in the presence of water, as described for example in DE-A-10313681, EP-A-1 198 491 and EP 9 220 65.

Also suitable are polyamides obtainable for example by condensation of 1,4-diaminobutane with adipic acid at elevated temperature (polyamide 4,6). Production processes for polyamides having this structure are described for example in EP-A-38 094, EP-A-38 582 and EP-A-039 524.

Also suitable are polyamides obtainable by copolymerization of two or more of the abovementioned monomers or mixtures of a plurality of polyamides in any desired mixing ratio.

Suitable polyamides preferably have a melting point of less than 265° C.

The following nonexhaustive list includes the recited polyamides and also further polyamides within the meaning of the invention as well as the monomers present.

AB polymers:

| PA 4 | pyrrolidone |
|---|---|
| PA 6 | ε-caprolactam |
| PA 7 | ethanolactam |
| PA 8 | caprylolactam |
| PA 9 | 9-aminopelargonic acid |
| PA 11 | 11-aminoundecanoic acid |
| PA 12 | laurolactam |

AA/BB polymers:

| PA 46 | tetramethylenediamine, adipic acid |
|---|---|
| PA 66 | hexamethylenediamine, adipic acid |
| PA 69 | hexamethylenediamine, azelaic acid |
| PA 610 | hexamethylenediamine, sebacic acid |
| PA 612 | hexamethylenediamine, decanedicarboxylic acid |
| PA 613 | hexamethylenediamine, undecanedicarboxylic acid |
| PA 1212 | 1,12-dodecanediamine, decanedicarboxylic acid |
| PA 1313 | 1,13-diaminotridecane, undecanedicarboxylic acid |
| PA 6T | hexamethylenediamine, terephthalic acid |
| PA MXD6 | m-xylylenediamine, adipic acid |
| PA 9T | nonamethylenediamine, terephthalic acid |

AA/BB polymers:

| PA6I | hexamethylenediamine, isophthalic acid |
|---|---|
| PA 6-3-T | trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |

| | |
|---|---|
| PA 6I/6T | (see PA 6I and PA 6T) |
| PAPACM 12 | diaminodicyclohexylmethane, laurolactam |
| PA 6I/6T/PACMT | as per PA 6I/6T + diaminodicyclohexylmethane, terephthalic acid |
| PA 6T/6I/MACMT | as per PA 6I/6T + dimethyldiaminocyclohexylmethane, terephthalic acid |
| PA 6T/6I/MXDT | as per PA 6I/6T + m-xylylenediamine, terephthalic acid |
| PA 12/MACMI | laurolactam, dimethyldiaminodicyclohexylmethane, isophthalic acid |
| PA 12/MACMT | laurolactam, dimethyldiaminodicyclohexylmethane, terephthalic acid |
| PA PDA-T | phenylenediamine, terephthalic acid |
| PA 6T/6I | (see PA 6T and PA 6I) |
| PA 6T/66 | (see PA 6T and PA 66) |

Component A) may be a blend of at least one aliphatic polyamide and at least one semiaromatic or aromatic polyamide.

Employed according to the invention as component A) for example are mixtures comprising polyamide 6 and polyamide 6.6 and optionally also polyamide 6I/6T. It is preferable to employ a majority of polyamide 6.6. The amount of polyamide 6 is preferably 5.0% to 50.0% by weight, particularly preferably 10.0% to 30.0% by weight, based on the amount of polyamide 6.6. In the event of co-use of polyamide 6I/6T the proportion thereof is preferably 10.0% to 25.0% by weight, particularly preferably 0% to 25.0% by weight, based on the amount of polyamide 6.6.

In place of or in addition to polyamide 6I/6T it is also possible to employ polyamide 6I or polyamide 6T or mixtures thereof.

Employed according to the invention in particular are polyamide 6, polyamide 66 and copolymers or mixtures thereof. The polyamide 6 or polyamide 66 preferably has a viscosity number of in the range from 80 to 180 ml/g, in particular 85 to 160 ml/g, in particular 90 to 140 ml/g, determined in a 0.5% by weight solution in 96% by weight sulfuric acid at 25° C. according to ISO 307.

A suitable polyamide 66 preferably has a viscosity number in the range from 110 to 170 ml/g, particularly preferably 130 to 160 ml/g.

For suitable semicrystalline and amorphous polyamides reference may further be made to DE 10 2005 049 297. They have a viscosity number of 90 to 210 ml/g, preferably 110 to 160 ml/g, determined in a 0.5% by weight solution in 96% by weight sulfuric acid at 25° C. according to ISO 307.

In the polyamide 6 or polyamide 66 0% to 10% by weight, preferably 0% to 5% by weight, may be replaced by semiaromatic polyamides. It is particularly preferable when no semiaromatic polyamides are co-used.

Component B)

As component B) the thermoplastic molding materials comprise 1.0% to 30.0% by weight, preferably 2.0% to 20.0% by weight, particularly preferably 3.0% to 10.0% by weight, in particular 3.5% to 7.0% by weight, of at least one elastomer.

Component B), the elastomer, is preferably selected from
b1) copolymers of ethylene with at least one comonomer selected from $C_{3-12}$-olefins, $C_{1-12}$-alkyl (meth)acrylates, (meth)acrylic acid, maleic anhydride, as component B1),
b2) polyethylene or polypropylene as component B2), wherein components B1) and B2) may also be additionally grafted with maleic anhydride.

Component B1) may comprise one or more different comonomers, preferably 1 to 3 different copolymers, particularly preferably one or two different comonomers. The $C_{3-12}$-olefins are preferably terminal, linear $C_{3-12}$-olefins, particularly preferably $C_{3-8}$-olefins. Examples of suitable olefins are propylene, 1-butene, 1-pentene, 1-hexene, 1-heptene and 1-octene.

The $C_{1-12}$-alkyl (meth)acrylates comprise $C_{1-12}$-alkyl radicals, preferably $C_{2-6}$-alkyl radicals, such as methyl, ethyl, propyl, butyl, pentyl, hexyl, ethylhexyl radicals. Alkyl acrylates are preferably concerned.

In the copolymers of component B1) the proportion of ethylene base units is preferably 1% to 99% by weight, particularly preferably 60% to 98% by weight, especially preferably 84% to 96% by weight.

The following preferred amounts apply for the comonomers:
$C_{3-12}$-olefins: preferably 99% to 1% by weight, particularly preferably 40% to 10% by weight,
$C_{1-12}$-alkyl (meth)acrylates: preferably 40% to 2% by weight, particularly preferably 30% to 5% by weight,
(Meth)acrylic acid: preferably 40% to 2% by weight, particularly preferably 30% to 5% by weight,
Maleic anhydride: preferably 3% to 0.01% by weight, particularly preferably 2% to 0.1% by weight.

The total amount of comonomers is preferably in the range from 1% to 99% by weight, particularly preferably 2% to 40% by weight.

The copolymers of the component B1) may be random or block copolymers. The former consist of a crystallizing and thus physically crosslinking main polymer (polyethylene) whose degree of crystallization is reduced by a comonomer randomly incorporated along the chain so that the crystallites in the finished molding material are no longer in direct contact. They then act as insulated crosslinking points as in conventional elastomers.

In block copolymers the hard and soft segments in a molecule are highly distinct. In thermoplastic elastomers the material demixes into a continuous phase and a discontinuous phase below a certain temperature. As soon as the latter falls below its glass temperature it in turn acts as a crosslinking point.

The copolymer of the component B1) may also be additionally grafted with maleic anhydride. The maleic anhydride used for the grafting is preferably employed in an amount of 5% to 0.005% by weight, particularly preferably 3% to 0.01% by weight, based on the copolymer of the component B1). In the grafted copolymer of the component B1) the maleic anhydride proportion is preferably in the range from 2% to 0.1% by weight, based on the ungrafted copolymer of the component B1).

Component B1) preferably has a melt flow index (MVR) (190° C./2.16 kg, according to ISO1133) value of 0.1 to 20 $cm^3/10$ min, particularly preferably 0.1 to 15 $cm^3/10$ min.

Employable alternatively or in addition to the component B1) as component B2) is polyethylene or polypropylene or a mixture of both. This component B2) may also be additionally grafted with maleic anhydride, wherein the proportion of maleic anhydride based on the polyolefin is 5% to 0.005% by weight, particularly preferably 2% to 0.1% by weight.

Component B2) preferably has an MVR (190° C./2.16 kg, according to ISO1133) value of 0.1 to 20 $cm^3/10$ min, particularly preferably 0.1 to 15 $cm^3/10$ min.

The term "elastomer" describes the components B1) and B2) which may optionally be grafted with maleic anhydride. Thermoplastic elastomers (TPE) may preferably be concerned. At room temperature TPE exhibit behavior comparable to the classical elastomers but are plastically deformable when heated and thus exhibit thermoplastic behavior.

Also employable according to the invention are mixtures of the components B1) and B2). These are in particular elastomer alloys (polyblends).

The thermoplastic elastomers are usually copolymers comprising a "soft" elastomer component and a "hard" thermoplastic component. Their properties are thus between those of elastomers and thermoplastics.

Polyolefin elastomers (POE) are polymerized for example through the use of metallocene catalysts, examples including ethylene-propylene elastomers (EPR or EPDM).

The most common polyolefin elastomers are copolymers of ethylene and butene or ethylene and octene.

For further description of the elastomers suitable as component B) reference may also be made to U.S. Pat. Nos. 5,482,997, 5,602,200, 4,174,358 and WO 2005/014278 A1.

Examples of suitable elastomers are obtainable for example from lyondellbasell under the designations Lucalen A2540D and Lucalen A2700M. Lucalen A2540D is a low density polyethylene comprising an n-butyl acrylate comonomer. It has a density of 0.923 g/cm$^3$ and a Vicat softening temperature of 85° C. at a butyl acrylate proportion of 6.5% by weight.

Lucalen A2700M is a low density polyethylene likewise comprising a butyl acrylate comonomer. It has a density of 0.924 g/cm$^3$, a Vicat softening temperature of 60° C. and a melting temperature of 95° C.

The polymer resin Exxelor™ VA 1801 from ExxonMobil is a semicrystalline ethylene copolymer functionalized with maleic anhydride by reactive extrusion and having an intermediate viscosity. First polymer backbone is fully saturated. The density is 0.880 g/cm$^3$ and the proportion of maleic anhydride is typically in the range from 0.5% to 1.0% by weight.

Further suitable components B) are known to those skilled in the art.

Component C)

As component C) the molding materials according to the invention comprise 10.0% to 69.0% by weight, preferably 0.0% to 55.0% by weight and in particular 25.0% to 45.0% by weight, especially 30.0% to 40.0% by weight, of glass fibers having a tensile strength according to DIN ISO 527-5 of 86.0 to 92.0 GPa, a tensile elastic modulus according to DIN ISO 527-5 of 2600 to 3200 M Pa and a softening point according to DIN ISO 7884-1 of 900° C. to 950° C., preferably having the composition C1) 55.5% to 62.0% by weight of $SiO_2$,
C2) 14.0% to 18.0% by weight of $Al_2O_3$,
C3) 11.0% to 16.0% by weight of CaO,
C4) 6.0% to 10.0% by weight of MgO,
C5) 0% to 4.0% by weight of further oxides, wherein the percentages by weight of C1) to C5) sum to 100%.

Further oxides C5) are to be understood as meaning oxides of the elements Li, Zn, Mn, Le, V, Ti, Be, Sn, Ba, Zr, Sr, Fe, B, Na, K or mixtures thereof.

For example the glass fibers may comprise up to 1% by weight, preferably up to 0.5% by weight of $Li_2O$ and/or $TiO_2$.

$Fe_2O_3$ and/or $B_2O_3$ may, if present, be comprised in amounts of 0.1% to 3% by weight, preferably 0.2% to 3% by weight.

According to the invention oxides of the elements Zn, Mn, Le, V, Be, Sn, Ba, Zr, Sn may, if present, each be comprised in amounts of 0.05% to 3% by weight, preferably of 0.2% to 1.5% by weight.

Suitable amounts for $Na_2O$ and/or $K_2O$ are, if present, at least 0.2% by weight, preferably 0.3% by weight to 4% by weight.

Essential preferred aspects of the glass fiber composition according to the invention are:
a) the ratio MgO (C4):$Al_2O_3$ (C2)) is preferably at least 1.4 to not more than 3.0, in particular from 1.5 to 2.8,
b) the ratio MgO (C4):CaO (C3)) is preferably 1.4 to 2.7, in particular from 1.2 to 2.6.

The sums of MgO+CaO and MgO+$Al_2O_3$ are especially preferably restricted to the following ranges:
a) 17.0% by weight<MgO+CaO<24.0% by weight, in particular 18.0% by weight<MgO+CaO<23.0% by weight, and
b) 20.0% by weight<MgO+$Al_2O_3$<26.0% by weight, in particular 21.0% by weight<MgO+$Al_2O_3$<25.0% by weight.

Production of the glass fibers C) is in general form disclosed in WO 2013/156477 and EP 3 130 633 A1. For further details reference is made to this document.

The glass fibers preferably employed according to the invention as chopped glass have a diameter of preferably 6 to 20 μm, preferably of 8 to 12 μm, in particular 10 μm, wherein the cross section of the glass fibers may be not only round but also oval or angular.

The glass fibers C) may be surface-pretreated with a silane compound for better compatibility with the thermoplastics. Suitable silane compounds are those of general formula $$(X-(CH_2)_n)_k-Si-(O-C_mH_{2m+1})_{4-k}$$

in which the substituents are defined as follows:
X: $NH_2-$, $HO-$,

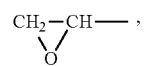

n: an integer from 2 to 10, preferably 3 to 4,
m: an integer from 1 to 5, preferably 1 to 2,
k: an integer from 1 to 3, preferably 1.

Preferred silane compounds are aminopropyltrimethoxysilane, aminobutyltrimethoxysilane, aminopropyltriethoxysilane, aminobutyltriethoxysilane and also the corresponding silanes which comprise a glycidyl group as substituent X.

The silane compounds are generally used for surface coating in amounts of 0.01% to 2%, preferably 0.025% to 1.0% and in particular 0.05% to 0.5% by weight (based on C)).

Other suitable coating compositions (also known as sizes) are based on isocyanates, phenolic resins or acrylic acid derivatives.

Component D)

As component D) the compositions according to the invention comprise 0% to 30.0% by weight, preferably 0% to 20.0% by weight, in particular 0% to 10.0% by weight, especially 0% to 5.0% by weight, of further additives. If such additives are co-used the minimum amount is 0.1% by weight, preferably 0.5% by weight, in particular 0.8% by weight.

If component D) is co-used the upper limit for the component A) is reduced correspondingly. Thus, at a minimum amount of 0.1% by weight of the component D) the upper limit for the amount of component A) is 88.9% by weight for example.

Contemplated further additives include glass fibers distinct from component C), fillers and reinforcers distinct from glass fibers, thermoplastic polymers distinct from components A) and B) or other additives.

As component D) the thermoplastic molding materials may comprise 0% to 20% by weight, preferably 0% to 10% by weight, particularly preferably 0% to 5% by weight, of glass fibers distinct from component C).

Especially employed as component D) are chopped glass fibers. The component D) especially comprises glass fibers, wherein short fibers are preferably employed. These preferably have a length in the range from 2 to 50 mm and a diameter of 5 to 40 μm. It is alternatively possible to use continuous fibers (rovings). Suitable fibers include those having a circular and/or noncircular cross-sectional area, wherein in the latter case the dimensional ratio of the main cross-sectional axis to the secondary cross-sectional axis is especially >2, preferably in the range from 2 to 8 and particularly preferably in the range from 3 to 5.

In a specific embodiment the component D) comprises so-called "flat glass fibers". These specifically have an oval or elliptical cross-sectional area or a necked elliptical (so-called "cocoon" fibers) or rectangular or virtually rectangular cross-sectional area. Preference is given here to using glass fibers with a noncircular cross-sectional area and a dimensional ratio of the main cross-sectional axis to the secondary cross-sectional axis of more than 2, preferably of 2 to 8, in particular of 3 to 5.

Reinforcement of the molding materials according to the invention may also be effected using mixtures of glass fibers having circular and noncircular cross sections. In a specific embodiment the proportion of flat glass fibers, as defined above, predominates, i.e. they account for more than 50% by weight of the total mass of the fibers.

When rovings of glass fibers are used as component D) said fibers preferably have a diameter of 10 to 20 μm, preferably of 12 to 18 μm. The cross section of these glass fibers may be round, oval, elliptical, virtually rectangular or rectangular. So-called flat glass fibers having a ratio of the cross-sectional axes of 2 to 5 are particularly preferred. E glass fibers are used in particular. However, it is also possible to use any other glass fiber types, for example A, C, D, M, S or R glass fibers, or any desired mixtures thereof or mixtures with E glass fibers.

In the context of the invention the term "filler and reinforcer" (=possible component D)) is to be interpreted broadly and comprises particulate fillers, fibrous substances distinct from glass fibers and any intermediate forms. Particulate fillers may have a wide range of particle sizes ranging from particles in the form of dusts to large grains. Contemplated filler materials include organic or inorganic fillers and reinforcers. Employable here are for example inorganic fillers, such as kaolin, chalk, wollastonite, talc, calcium carbonate, silicates, titanium dioxide, zinc oxide, graphite, glass particles, for example glass spheres, nanoscale fillers, such as carbon nanotubes, nanoscale sheet silicates, nanoscale alumina ($Al_2O_3$), nanoscale titanium dioxide ($TiO_2$), graphene, permanently magnetic or magnetizable metal compounds and/or alloys, phyllosilicates and nanoscale silicon dioxide ($SiO_2$). The fillers may also have been surface treated.

Examples of phyllosilicates usable in the molding materials according to the invention include kaolins, serpentines, talc, mica, vermiculites, illites, smectites, montmorillonite, hectorite, double hydroxides or mixtures thereof. The phyllosilicates may have been surface treated or may be untreated.

One or more fibrous substances may also be employed. These are preferably selected from known inorganic reinforcing fibers, such as boron fibers, carbon fibers, silica fibers, ceramic fibers and basalt fibers; organic reinforcing fibers, such as aramid fibers, polyester fibers, nylon fibers, polyethylene fibers and natural fibers, such as wood fibers, flax fibers, hemp fibers and sisal fibers.

It is especially preferable to employ carbon fibers, aramid fibers, boron fibers, metal fibers or potassium titanate fibers.

It is preferable when no glass fibers distinct from component C) and no other fillers and reinforcers are employed.

The thermoplastic polymers distinct from component A) and B) are preferably selected from homo- or copolymers which comprise in copolymerized form at least one monomer selected from $C_2$-$C_{10}$-monoolefins, for example ethylene or propylene, 1,3-butadiene, 2-chloro-1,3-butadiene, vinyl alcohol and the $C_2$-$C_{10}$-alkyl esters thereof, vinyl chloride, vinylidene chloride, vinylidene fluoride, tetrafluoroethylene, glycidyl acrylate, glycidyl methacrylate, acrylates and methacrylates having alcohol components of branched and unbranched $C_1$-$C_{10}$-alcohols, vinylaromatics, for example styrene, acrylonitrile, methacrylonitrile, α,β-ethylenically unsaturated mono- and dicarboxylic acids, and maleic anhydride, homo- and copolymers of vinyl acetals, polyvinyl esters, polycarbonates (PC), polyesters, such as polyalkylene terephthalates, polyhydroxyalkanoates (PHA), polybutylene succinates (PBS), polybutylene succinate adipates (PBSA), polyethers, polyether ketones, thermoplastic polyurethanes (TPU), polysulfides, polysulfones, polyether sulfones, cellulose alkyl esters and mixtures thereof.

Examples include polyacrylates having identical or different alcohol radicals from the group of $C_4$-$C_8$ alcohols, particularly of butanol, hexanol, octanol and 2-ethylhexanol, polymethylmethacrylate (PMMA), methyl methacrylate-butyl acrylate copolymers, acrylonitrile-butadiene-styrene copolymers (ABS), ethylene-propylene copolymers, ethylene-propylene-diene copolymers (EPDM), polystyrene (PS), styrene-acrylonitrile copolymers (SAN), acrylonitrile-styrene-acrylate (ASA), styrene-butadiene-methyl methacrylate copolymers (SBMMA), styrene-maleic anhydride copolymers, styrene-methacrylic acid copolymers (SMA), polyoxymethylene (POM), polyvinyl alcohol (PVAL), polyvinyl acetate (PVA), polyvinyl butyral (PVB), polycaprolactone (PCL), polyhydroxybutyric acid (PHB), polyhydroxyvaleric acid (PHV), polylactic acid (PLA), ethyl cellulose (EC), cellulose acetate (CA), cellulose propionate (CP) or cellulose acetate/butyrate (CAB).

The at least one thermoplastic polymer optionally also present in the molding material according to the invention is preferably polyvinyl chloride (PVC), polyvinyl butyral (PVB), homo- and copolymers of vinyl acetate, homo- and copolymers of styrene, polyacrylates, thermoplastic polyurethanes (TPUs) or polysulfides.

Suitable preferred additives D) are lubricants and heat stabilizers but also flame retardants, light stabilizers (UV stabilizers, UV absorbers or UV blockers), dyes and nucleating agents and optionally also metallic pigments, metal flakes, metal-coated particles, antistats, conductivity additives, demolding agents, optical brighteners, defoamers, etc.

As component D) the molding materials according to the invention may comprise preferably 0.01% to 3% by weight, particularly preferably 0.02% to 2% by weight, in particular 0.05% to 1.0% by weight, of at least one heat stabilizer based on the total weight of the composition.

The heat stabilizers are preferably selected from copper compounds, secondary aromatic amines, sterically hindered phenols, phosphites, phosphonites and mixtures thereof.

If a copper compound is used the amount of copper is preferably 0.003% to 0.5% by weight, in particular 0.005% to 0.3% by weight and particularly preferably 0.01% to 0.2% by weight, based on the total weight of the composition.

If stabilizers based on secondary aromatic amines are used the amount of these stabilizers is preferably 0.2% to 2% by weight, particularly preferably 0.2% to 1.5% by weight, based on the total weight of the composition.

If stabilizers based on sterically hindered phenols are used the amount of these stabilizers is preferably 0.1% to 1.5% by weight, particularly preferably 0.2% to 1% by weight, based on the total weight of the composition.

If stabilizers based on phosphites and/or phosphonites are used the amount of these stabilizers is preferably 0.1% to 1.5% by weight, particularly preferably from 0.2% to 1% by weight, based on the total weight of the composition.

Suitable compounds D) of mono- or divalent copper are, for example, salts of mono- or divalent copper with inorganic or organic acids or mono- or dihydric phenols, the oxides of mono- or divalent copper or the complexes of copper salts with ammonia, amines, amides, lactams, cyanides or phosphines, preferably Cu(I) or Cu(II) salts of hydrohalic acids or of hydrocyanic acids or the copper salts of aliphatic carboxylic acids. Particular preference is given to the monovalent copper compounds CuCl, CuBr, CuI, CuCN and Cu$_2$O and to the divalent copper compounds CuCl$_2$, CuSO$_4$, CuO, copper(II) acetate or copper(II) stearate.

The copper compounds are commercially available and/or the production thereof is known to those skilled in the art. The copper compound may be used as such or in the form of concentrates. A concentrate is to be understood as meaning a polymer, preferably of the same chemical nature as component A), comprising the copper salt in a high concentration. The use of concentrates is a customary process and is particularly often employed when very small amounts of an input material are to be added. It is advantageous to employ the copper compounds in combination with further metal halides, in particular alkali metal halides, such as NaI, KI, NaBr, KBr, wherein the molar ratio of metal halide to copper halide is 0.5 to 20, preferably 1 to 10 and particularly preferably 3 to 7.

Particularly preferred examples of stabilizers which are based on secondary aromatic amines and are usable in accordance with the invention include adducts of phenylenediamine with acetone (Naugard® A), adducts of phenylenediamine with linolenic acid, 4,4'-bis(α, α-dimethylbenzyl) diphenylamine (Naugard® 445), N,N'-dinaphthyl-p-phenylenediamine, N-phenyl-N'-cyclohexyl-p-phenylenediamine or mixtures of two or more thereof.

Preferred examples of stabilizers employable according to the invention and based on sterically hindered phenols include N,N'-hexamethylenebis-3-(3,5-di-tert-butyl-4-hydroxyphenyl)propionamide, bis(3,3-bis(4'-hydroxy-3'-tert-butylphenyl)butanoic acid) glycol ester, 2,1'-thioethyl bis(3-(3,5-di-tert-butyl-4-hydroxyphenyl))propionate, 4,4'-butylidenebis(3-methyl-6-tert-butylphenol), triethylene glycol 3-(3-tert-butyl-4-hydroxy-5-methylphenyl)propionate or mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis(2,4-di-tert-butylphenyl) pentaerythrityl diphosphite, bis(2,6-di-tert-butyl-4-methylphenyl) pentaerythrityl diphosphite, diisodecyloxy pentaerythrityl diphosphite, bis(2,4-di-tert-butyl-6-methylphenyl) pentaerythrityl diphosphite, bis(2,4,6-tris(tert-butylphenyl)) pentaerythrityl diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenzo-[d,g]-1,3,2-dioxaphosphocin, 6-fluoro-2,4,8,10-tetra-tert-butyl-12-methyldibenzo-[d,g]-1,3,2-dioxaphosphocin, bis(2,4-di-tert-butyl-6-methylphenyl) methyl phosphite and bis(2,4-di-tert-butyl-6-methylphenyl) ethyl phosphite. Preference is given in particular to tris[2-tert-butyl-4-thio(2'-methyl-4'-hydroxy-5'-tert-butyl)phenyl-5-methyl]phenyl phosphite and tris(2,4-di-tert-butylphenyl) phosphite (Hostanox® PAR24: commercially available from BASF SE).

A preferred embodiment of the heat stabilizer consists in the combination of organic heat stabilizers (especially Hostanox PAR 24 and Irganox 1010), a bisphenol A-based epoxide (especially Epikote 1001) and copper stabilization based on CuI and KI. An example of a commercially available stabilizer mixture consisting of organic stabilizers and epoxides is Irgatec® NC66 from BASF SE. Heat stabilization based exclusively on CuI and KI is especially preferred. Other than the addition of copper or copper compounds, the use of further transition metal compounds, especially metal salts or metal oxides of group VB, VIB, VIIB or VIIIB of the Periodic Table, is possible or else precluded. It may moreover be preferable not to add transition metals of group VB, VIB, VIIB or VIIIB of the Periodic Table, for example iron powder or steel powder, to the molding material according to the invention or not.

The molding materials according to the invention may comprise as additive E) 0% to 20.0% by weight, particularly preferably 0% to 10.0% by weight, based on the total weight of the composition, of at least one flame retardant. When the inventive molding materials comprise at least one flame retardant they do so preferably in an amount of 0.01% to 20% by weight, particularly preferably of 0.1% to 10% by weight, based on the total weight of the composition. Suitable flame retardants include halogen-containing and halogen-free flame retardants and synergists thereof (see also Gächter/Müller, 3rd edition, 1989, Hanser Verlag, chapter 11). Preferred halogen-free flame retardants are red phosphorus, phosphinic or diphosphinic salts and/or nitrogen-containing flame retardants such as melamine, melamine cyanurate, melamine sulfate, melamine borate, melamine oxalate, melamine phosphate (primary, secondary) or secondary melamine pyrophosphate, neopentyl glycol boric acid melamine, guanidine and derivatives thereof known to those skilled in the art, and also polymeric melamine phosphate (CAS No.: 56386-64-2 and 218768-84-4 and also EP-A-1 095 030), ammonium polyphosphate, trishydroxyethyl isocyanurate (optionally also ammonium polyphosphate in admixture with trishydroxyethyl isocyanurate) (EP-A-058 456 7). Further N-containing or P-containing flame retardants or PN condensates suitable as flame retardants, as well as the synergists customary therefor such as oxides or borates, may be found in DE-A-10 2004 049 342. Suitable halogen-containing flame retardants are for example oligomeric brominated polycarbonates (BC 52 Great Lakes) or polypentabromobenzyl acrylates with N greater than 4 (FR 1025 Dead sea bromine), reaction products of tetrabromobisphenol A with epoxides, brominated oligomeric or polymeric styrenes, dechlorane, which are usually used with antimony oxides as synergists (for details and further flame retardants see DE-A-10 2004 050 025).

The thermoplastic molding materials according to the invention may comprise 0% to 1.5% by weight, preferably 0.05% to 1.5% by weight and particularly preferably 0.1% to 1% by weight of a lubricant.

Preference is given to Al salts, alkali metal salts, alkaline earth metal salts or esters or amides of fatty acids having from 10 to 44 carbon atoms, preferably having from 14 to 44 carbon atoms. The metal ions are preferably alkaline earth metal and Al, wherein Ca or Mg are particularly preferred. Preferred metal salts are Ca stearate and Ca montanate and also Al stearate. It is also possible to use mixtures of different salts in any desired mixing ratio.

The carboxylic acids may be mono- or dibasic. Examples include pelargonic acid, palmitic acid, lauric acid, margaric acid, dodecanedioic acid, behenic acid, and particularly preferably stearic acid, capric acid and montanic acid (mixture of fatty acids having from 30 to 40 carbon atoms).

The aliphatic alcohols may be mono- to tetrahydric. Examples of alcohols include n-butanol, n-octanol, stearyl alcohol, ethylene glycol, propylene glycol, neopentyl glycol, and pentaerythritol, preference being given here to glycerol and pentaerythritol.

The aliphatic amines may be mono- to trifunctional. Examples thereof are stearylamine, ethylenediamine, propylenediamine, hexamethylenediamine, and di(6-aminohexyl)amine, wherein ethylenediamine and hexamethylenediamine are particularly preferred. Preferred esters or amides are correspondingly glyceryl distearate, glyceryl tristearate, ethylenediamine distearate, glyceryl monopalmitate, glyceryl trilaurate, glyceryl monobehenate and pentaerythrityl tetrastearate.

It is also possible to use mixtures of different esters or amides or esters combined with amides in any desired mixing ratio.

The polyamide molding materials are produced by processes known per se. These include the mixing of the components in the appropriate proportions by weight.

It is also possible to employ recyclates of the individual components or else of mixtures, in particular of the components A) and B). Through addition of the component C) such recyclates may be converted into molding materials according to the invention.

The mixing of the components is preferably accomplished at elevated temperatures by commixing, blending, kneading, extruding or rolling. The temperature during mixing is preferably in a range from 220° C. to 340° C., particularly preferably from 240° C. to 320° C. and especially from 250° C. to 300° C. Suitable methods are known to those skilled in the art.

Shaped Articles

The present invention further relates to molded articles produced using the polyamide molding materials according to the invention.

The polyamide molding materials may be used for producing moldings by any desired suitable processing techniques. Suitable processing techniques are especially injection molding, extrusion, coextrusion, thermoforming or any other known polymer shaping method. These and further examples may be found for example in "Einfärben von Kunststoffen" [Coloring of Plastics], VDI-Verlag, ISBN 3-18-404014-3.

The present invention also relates to a process for producing the molding materials according to the invention which comprises mixing components A), B), C) and optionally D) in the appropriate amounts, preferably by extrusion. This process may employ commercially available twin-screw extruders of different sizes (screw diameters). The temperature during the extrusion is 200° C. to 400° C., preferably 250° C. to 350° C., particularly preferably 250° C. to 320° C.

The molded articles produced from the molding materials according to the invention are used for producing internal and external parts, preferably with a load-bearing or mechanical function, in the sectors of electrical, furniture, sports, mechanical engineering, sanitary and hygiene, medicine, energy technology and drivetrain technology, automobiles and other conveyances, casings material for telecommunications devices and apparatuses, consumer electronics, household appliances, mechanical engineering, heating, fastenings for installations or for containers, and ventilation components of all types.

The mechanics, in particular the impact strength, of the moldings according to the invention is markedly higher, this being coupled with improved shrinkage.

Processing Methods

Useful processing methods include not only the customary processing methods such as extrusion or injection molding but also:

CoBi injection or assembly injection molding for hybrid components where the polyester molding material according to the invention is combined with other compatible or incompatible materials, for example thermoplastics, thermosets or elastomers;

insert components, such as bearing seats or screw-thread inserts made of the polyester molding material according to the invention and overmolded with other compatible or incompatible materials, for example thermoplastics, thermosets or elastomers;

outsert components, such as frames, casings, or supports made of the polyamide molding material according to the invention into which functional elements made of other compatible or incompatible materials, for example thermoplastics, thermosets or elastomers, are injected;

hybrid components (elements made of the polyamide molding material according to the invention combined with other compatible or incompatible materials, for example thermoplastics, thermosets or elastomers) produced by composite injection molding, injection welding, assembly injection molding, ultrasound welding, frictional or laser welding, bonding, beading or riveting;

semifinished products and profiles (for example produced by extrusion, pultrusion, layering or lamination);

surface coating, laminating, chemical or physical metallization, flocking, where the polyamide molding material of the invention may be the substrate itself or the substrate support, or, in the case of hybrid/bi-injection components, may be a defined substrate region, which may also be brought to the surface by subsequent chemical treatment (for example etching) or physical treatment (for example machining or laser ablation);

printing, transfer printing, 3D printing, laser marking.

The examples that follow serve to elucidate the invention without restricting it in any way.

EXAMPLES

The following input materials were used:

Polyamide 6: Ultramid® B27 from BASF SE, melting point: 220° C., viscosity number (0.5% in 96% $H_2SO_4$): 150 ml/g, amino end groups: 37 mmol/kg Polyamide 6.6: Ultramid® A27 from BASF SE, viscosity number (0.5% in 96% $H_2SO_4$): 150 ml/g, melting point: 264° C., amino end groups: 48 mmol/kg Elastomer: ethylene-propylene elastomer, grafted with maleic anhydride, Exxelor™ VA 1801 from ExxonMobil Petroleum & Chemical BVBA, density: 0.88 g/ml, melt flow index (230° C./10 kg; ISO1133): 9 g/10 min, glass transition temperature: −44° C.

ECR glass fiber: standard E-Glass NEG ChopVantage 3610HP; diameter: 10 μm

High-strength glass fiber: Composition: $SiO_2$: 60.8% by weight, $Al_2O_3$: 15.2% by weight, MgO: 6.8% by weight, CaO: 15.5% by weight, $Na_2O$: 0.8% by weight; treated with a silane size suitable for bonding to PA; diameter: 10 μm Stabilizer: Irganox® 1098 from BASF SE Lubricant: ethylenebisstearamide (EBS) from Lonza Cologne GmbH Carbon black: Printex 60 from Orion Engineered Carbons The molding materials were produced by mixing the ingredients listed below in a twin-screw extruder ZE 25 A UTXi at temperatures of 260° C. The properties specified in the tables 1 and 2 below were determined by the specified standards valid 2019. The proportions of the ingredients are reported in % by weight.

TABLE 1

| Composition | | | Comparison 1 | Comparison 2 | Example 1 | Example 2 | Comparison 3 |
|---|---|---|---|---|---|---|---|
| Polyamide 6 | | | 57.1 | 60.6 | 57.1 | 60.6 | 64.1 |
| ECR glass fiber | | | 35 | 35 | 0 | 0 | 0 |
| High-strength glass fiber | | | 0 | 0 | 35 | 35 | 35 |
| Elastomer | | | 7 | 3.5 | 7 | 3.5 | 0 |
| Stabilizer | | | 0.2 | 0.2 | 0.2 | 0.2 | 0.2 |
| Carbon black | | | 0.5 | 0.5 | 0.5 | 0.5 | 0.5 |
| Lubricant | | | 0.2 | 0.2 | 0.2 | 0.2 | 0.2 |
| | Unit | DIN | ISO | | | | |
| | | | Product features | | | | |
| Density | g/cm³ | 53479 | 1183 | 1.38 | 1.39 | 1.38 | 1.39 | 1.41 |
| | | | Mechanical properties (dry) | | | | |
| Tensile elastic modulus | MPa | | 527 | 10209 | 10621 | 10812 | 11368 | 11818 |
| Breaking stress | MPa | | 527 | 159 | 171 | 176 | 191 | 205 |
| Breaking elongation | % | | 527 | 4.6 | 3.8 | 6.0 | 4.9 | 3.9 |
| Charpy impact strength | kJ/m² | | 179-2/1eU | 102 | 97 | 121 | 115 | 108 |
| Charpy notched impact strength | kJ/m² | | 179-2/1eAf | 18.5 | 15.5 | 21.8 | 17.8 | 14.7 |

TABLE 2

| Composition | Comparison 1 | Comparison 2 | Example 1 | Example 2 | Comparison 3 |
|---|---|---|---|---|---|
| PA 6,6 | 59.1 | 64.1 | 59.1 | 64.1 | 69.1 |
| ECR glass fiber | 30 | 30 | 0 | 0 | 0 |
| High-strength glass fiber | 0 | 0 | 30 | 30 | 30 |
| Elastomer | 10 | 5 | 10 | 5 | 0 |
| Stabilizer | 0.2 | 0.2 | 0.2 | 0.2 | 0.2 |
| Carbon black | 0.5 | 0.5 | 0.5 | 0.5 | 0.5 |
| Lubricant | 0.2 | 0.2 | 0.2 | 0.2 | 0.2 |

TABLE 2-continued

|  | Unit | DIN | ISO |  |  |  |  |  |
|---|---|---|---|---|---|---|---|---|
| Product features |
| Density | g/cm³ | 53479 | 1183 | 1.33 | 1.34 | 1.33 | 1.34 | 1.36 |
| Mechanical properties (dry) |
| Tensile modulus of elasticity | MPa |  | 527 | 8613 | 9213 | 9221 | 9912 | 10526 |
| Breaking stress | MPa |  | 527 | 137 | 165 | 150 | 181 | 208 |
| Breaking elongation | % |  | 527 | 3.6 | 3.5 | 4.1 | 3.9 | 3.8 |
| Charpy impact strength | kJ/m² |  | 179-2/1eU | 92 | 81 | 118 | 105 | 93 |
| Charpy notched impact strength | kJ/m² |  | 179-2/1eAf | 15.2 | 11.4 | 19.5 | 15.0 | 10.5 |

The invention claimed is:

1. A method of using glass fibers having a tensile strength according to DIN ISO 527-5 of 86.0 to 92.0 GPa, a tensile elastic modulus according to DIN ISO 527-5 of 2600 to 3200 MPa and a softening point according to DIN ISO 7884-1 of 900° C. to 950° C., the method comprising using the glass fibers to increase an impact strength and/or breaking elongation of molded articles made of molding materials comprising thermoplastic polyamides and elastomers;
wherein the method comprises mixing components A) to C) and optionally D):
a) 30.0% to 89.0% by weight of at least one thermoplastic polyamide as component A),
b) 1.0% to 30.0% by weight of at least one elastomer as component B), selected from the group consisting of
b1) copolymers of ethylene with at least one comonomer selected from the group consisting of $C_{3-12}$-olefins, $C_{1-12}$-alkyl (meth)acrylates, (meth)acrylic acid and maleic anhydride as component B1),
b2) polyethylene or polypropylene elastomer as component B2),
wherein components B1) and B2) may also be additionally grafted with maleic anhydride,
c) 10.0% to 69.0% by weight of glass fibers having a tensile strength according to DIN ISO 527-5 of 86.0 to 92.0 GPa, a tensile elastic modulus according to DIN ISO 527-5 of 2600 to 3200 MPa and a softening point according to DIN ISO 7884-1 of 900° C. to 950° C. as component C), and
d) 0% to 30.0% by weight of further additives and processing aids as component D),
wherein the percentages by weight of the components A) to D) sum to 100% by weight,
and further comprises extruding, injection molding or blow molding thermoplastic molding material to produce fibers, films, or molded articles made of the thermoplastic molding material.

2. The method according to claim 1, wherein glass fibers having the composition
C1) 55.5% to 62.0% by weight of $SiO_2$,
C2) 14.0% to 18.0% by weight of $Al_2O_3$,
C3) 11.0% to 16.0% by weight of CaO,
C4) 6.0% to 10.0% by weight of MgO, and
C5) 0% to 4.0% by weight of further oxides
are employed,
wherein the proportions of C3) CaO and C4) MgO sum to between 17.0% and 24.0% by weight and the percentages by weight of C1) to C5) sum to 100% by weight.

3. The method according to claim 1, wherein the thermoplastic molding materials comprise at least one elastomer selected from the group consisting of
b1) copolymers of ethylene with at least one comonomer selected from the group consisting of $C_{3-12}$-olefins, $C_{1-12}$-alkyl (meth)acrylates, (meth)acrylic acid and maleic anhydride as component B1), and
b2) polyethylene or polypropylene elastomer as component B2),
wherein components B1) and B2) may also be additionally grafted with maleic anhydride.

4. A thermoplastic molding material comprising
a) 30.0% to 89.0% by weight of at least one thermoplastic polyamide as component A),
b) 1.0% to 30.0% by weight of at least one elastomer as component B), selected from the group consisting of
b1) copolymers of ethylene with at least one comonomer selected from the group consisting of $C_{3-12}$-olefins, $C_{1-12}$-alkyl (meth)acrylates, (meth)acrylic acid and maleic anhydride as component B1),
b2) polyethylene or polypropylene elastomer as component B2),
wherein components B1) and B2) may also be additionally grafted with maleic anhydride,
c) 10.0% to 69.0% by weight of glass fibers having a tensile strength according to DIN ISO 527-5 of 86.0 to 92.0 GPa, a tensile elastic modulus according to DIN ISO 527-5 of 2600 to 3200 MPa and a softening point according to DIN ISO 7884-1 of 900° C. to 950° C. as component C), and
d) 0% to 30.0% by weight of further additives and processing aids as component D),
wherein the percentages by weight of the components A) to D) sum to 100% by weight.

5. The molding material according to claim 4, wherein a component C) having the composition
C1) 55.5% to 62.0% by weight of $SiO_2$,
C2) 14.0% to 18.0% by weight of $Al_2O_3$,
C3) 11.0% to 16.0% by weight of CaO,
C4) 6.0% to 10.0% by weight of MgO, and
C5) 0% to 4.0% by weight of further oxides
is employed,
wherein the proportions of C3) CaO and C4) MgO sum to between 17.0% and 24.0% by weight and the percentages by weight of C1) to C5) sum to 100% by weight.

6. The molding material according to claim 4, wherein component D) comprises heat stabilizers, carbon black and lubricants.

7. The molding material according to claim 4, wherein component B) is employed in an amount of 2.0% to 20.0% by weight.

8. The thermoplastic molding material according to claim 4, wherein component A) is selected from the group consisting of polyamide 6, polyamide 66, polyamide 6.10 and copolymers or mixtures thereof.

9. The molding material according to claim 4, wherein component C) is employed in an amount of 10.0% to 55.0% by weight.

10. The molding material according to claim 4, which comprises component B1) in which the at least one comonomer is selected from the group consisting of $C_{3-8}$-olefins, $C_{2-6}$-alkyl acrylates, and maleic anhydride.

11. The molding material according to claim 4, which comprises the component B1) and/or B2) grafted with maleic anhydride.

12. A process for producing a thermoplastic molding material according to claim 4, the process comprising mixing the components A) to C) and optionally D).

13. A fiber, film or molded article made of the thermoplastic molding material according to claim 4.

14. A process for producing fibers, films or molded articles made of the thermoplastic molding material according to claim 4, the process comprising extruding, injection molding or blow molding the thermoplastic molding material.

15. The molding material according to claim 4, wherein component B) is employed in an amount of 3.0% to 10.0% by weight.

16. The molding material according to claim 4, wherein component B) is employed in an amount of 3.5% to 7.0% by weight.

17. The molding material according to claim 4, wherein component C) is employed in an amount of 15.0% to 50.0% by weight.

18. The molding material according to claim 4, wherein component C) is employed in an amount of 25.0% to 40.0% by weight.

* * * * *